June 26, 1962      A. R. NORDEN      3,041,505

SEQUENCE PHASED PANELBOARDS

Filed Sept. 19, 1958      4 Sheets-Sheet 1

INVENTOR
ALEXANDER R. NORDEN
BY
ATTORNEY

June 26, 1962  A. R. NORDEN  3,041,505
SEQUENCE PHASED PANELBOARDS
Filed Sept. 19, 1958  4 Sheets-Sheet 2

INVENTOR
ALEXANDER R. NORDEN
BY Paul S. Martin
ATTORNEY

June 26, 1962     A. R. NORDEN     3,041,505
SEQUENCE PHASED PANELBOARDS
Filed Sept. 19, 1958     4 Sheets-Sheet 3

INVENTOR
ALEXANDER R. NORDEN
BY
ATTORNEY

June 26, 1962  A. R. NORDEN  3,041,505
SEQUENCE PHASED PANELBOARDS
Filed Sept. 19, 1958  4 Sheets-Sheet 4
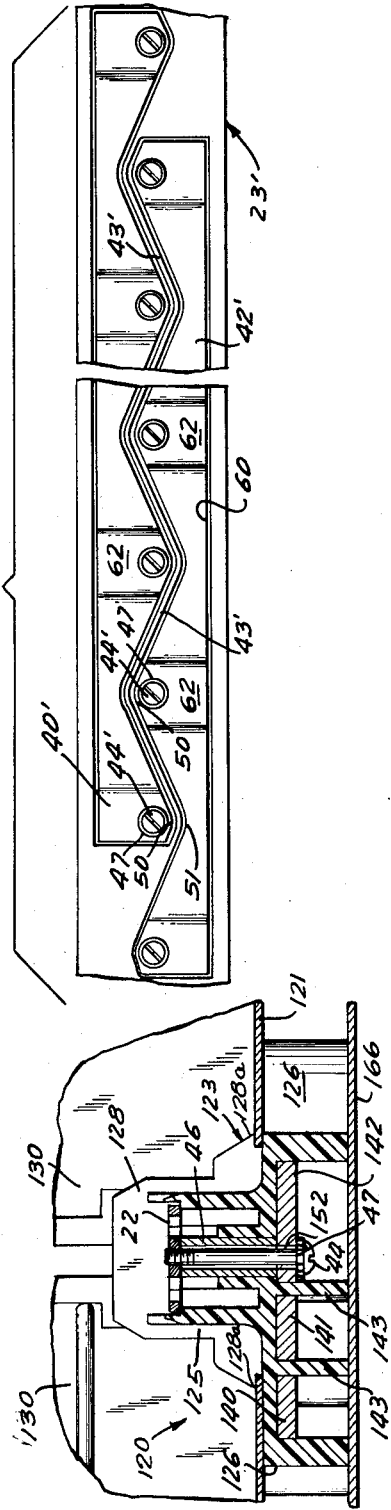
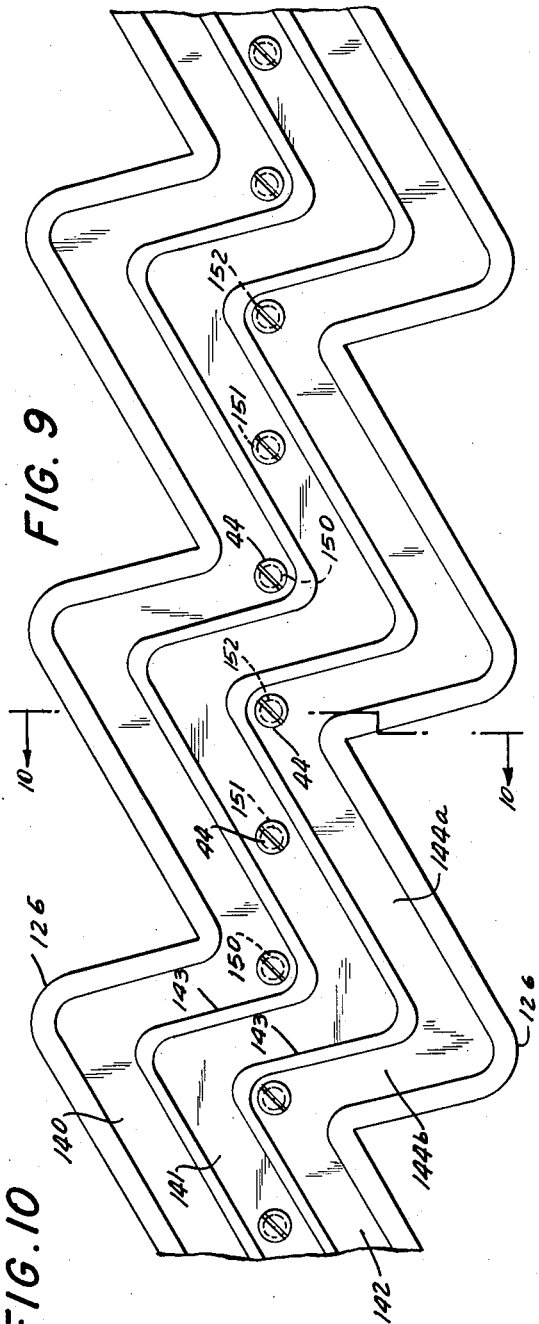
INVENTOR
ALEXANDER R. NORDEN
BY
ATTORNEY

United States Patent Office 3,041,505
Patented June 26, 1962

3,041,505
SEQUENCE PHASED PANELBOARDS
Alexander R. Norden, New York, N.Y., assignor to Federal Pacific Electric Company, a corporation of Delaware
Filed Sept. 19, 1958, Ser. No. 762,156
15 Claims. (Cl. 317—119)

My invention relates in general to panelboards for circuit breakers or other electrical devices and in particular to a novel bussing arrangement. The term "panelboard" is used here to include load centers and the like.

Circuit breaker panelboards have one or two rows of circuit breakers arranged to distribute current from a bus assembly forming part of the panelboard. The bus assembly commonly has two busses for the two "phases" of a three-wire single phase system and the bus assembly of a three-phase panelboard has three busses. The circuit breakers in a single-phase panelboard are either single-pole or two-pole, while a three-phase panelboard having three busses may have single-pole, two-pole, or three-pole circuit breakers. Multi-pole circuit breakers for such panelboards are dimensioned to occupy the same space in the panelboard as an equal number of single-pole circuit breakers. The physically adjacent poles of each multi-pole circuit breaker are required to be connected to different supply phases. In some single-phase panelboards, (as that shown in U.S. Patent 2,647,225) two-pole circuit breakers will be properly energized only if mounted in certain special places. Three-phase panelboards are known (as that shown in my Patent 2,739,272) that will provide busses of three phases for three-pole circuit breakers wherever they are mounted on the panelboards. Such panelboards are known as 100% sequence-phased. Sequence-phasing is important even where only single-phase breakers are involved. The loads tend to be balanced among the phases as the circuit breakers are successively mounted side by side even though less than the full capacity of the panelboard is occupied by circuit breakers.

An object of the present invention resides in a novel type of panelboard construction for achieving sequence-phasing in both single-phase and three-phase panelboards.

A number of methods and devices have been employed to obtain 100% sequence phasing in panelboards. An objection to many of these known panelboards is that a large number of parts of different forms are needed to provide connections from each phase bus to the circuit breakers. It has not been possible, prior to the advent of my present invention, to use identical connections everywhere in a panelboard and still retain the advantages accruing to a system which is 100% sequence phased.

Accordingly, it is an important object of my invention to provide a bussing arrangement for panelboards, load centers and similar units with 100% sequence phasing in which the terminals used in conjunction with all the busses are alike.

It is a further object of my invention to provide such a system which may be employed in conjunction with various types of panelboard terminals and cooperating plug-in terminals.

It is a still further object of my invention to provide such an arrangement for use with three-phase, four-wire systems.

It is a still further object of my invention to provide a panelboard having a novel 100% sequence-phased bus assembly wherein the circuit breakers can be installed flush with the mounting pan on which the bus assembly is mounted. This reduces the depth of the unit that would otherwise require added space below the circuit breakers for the assembly.

Other objects, features and advantages of my invention will be apparent from the following description of three illustrative embodiments of the invention shown in the accompanying drawings, wherein:

FIG. 8 is a fragmentary bottom view of the bus assembly of the panelboard in FIG. 6;

FIG. 9 is a fragmentary bottom plan view of a bus assembly of a third embodiment of my invention; and FIG. 10 is a fragmentary cross-section of a panelboard using the bus assembly of FIG. 9, viewed as indicated by the line 10—10 therein.

Figure 1:
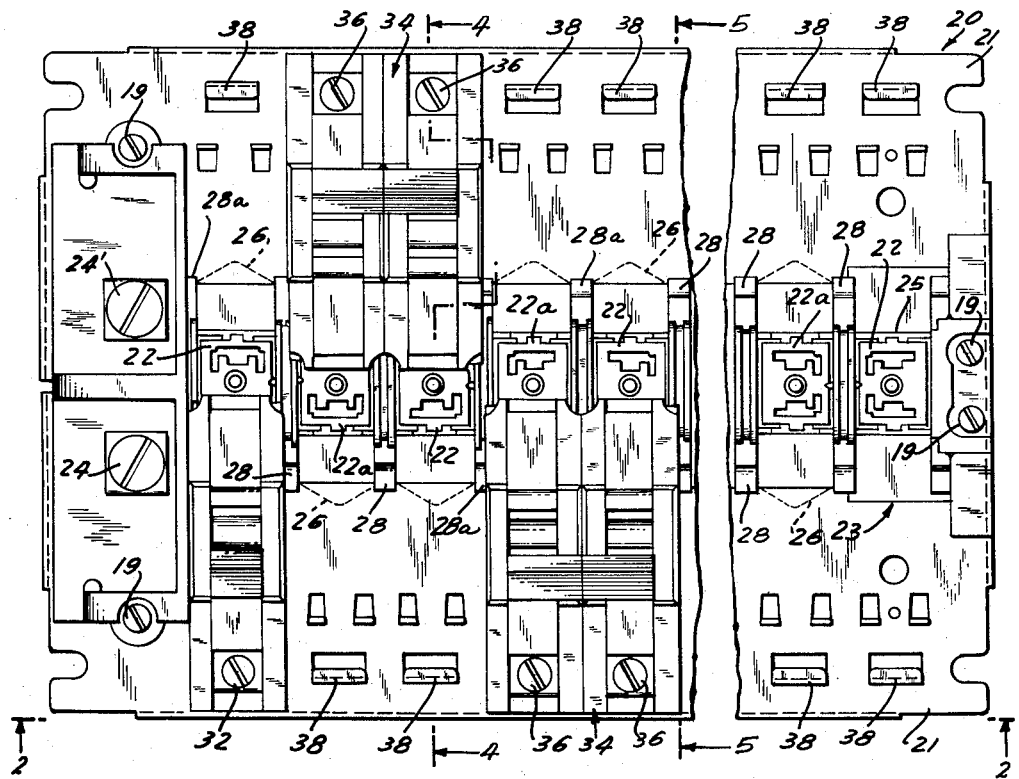
FIGURE 1 is a plan view of a panelboard fabricated in accordance with the teachings of my invention for a single-phase, three-wire system.
Figure 2:
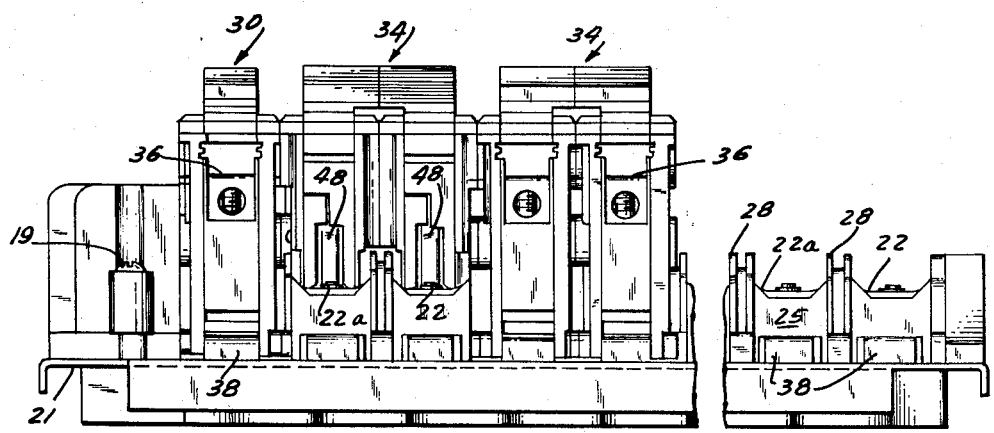
FIGURE 2 is an elevational view, viewed in the direction of the arrows along the line 2—2 of FIGURE 1.

Considering FIGS. 1–5 of the drawings in detail, there is shown a panelboard assembly 20. Such assemblies are usually secured in a box or enclosure (details not shown here) and provided with a front trim plate and, optionally, a front door or closure. Such construction has been described in my U.S. Patent 2,739,272, assigned to the assignee hereof. Two-part mounting pan 21 is united to molded insulating member 23, forming a unit that is attached to the rear wall or bottom of a metal enclosure. Screws 19 unite the two parts of the metal mounting pan to the molded member 23.

Contact terminals 22 and 22a which are shown as either the E-slot or the F-slot type are supported on molded insulating member 23. Contact terminals 22 and 22a are alike the letter "a" being used to distinguish the terminals connected to the respective bus phases. One contact terminal 22 (or 22a) is supported between each pair of insulating barriers 28 that are integral with insulating member 23. It is understood that each contact terminal 22 will accommodate two end-to-end single-pole circuit breakers, one single-pole circuit breaker in each of the two rows illustrated in FIGS. 1 and 4. Screw terminals or solderless connectors 24 and 24' are used for making electrical connection to the incoming power lines. Connectors 36 are utilized for making electrical connections from the individual poles of the various circuit breakers to the respective protected circuits.

Circuit breaker 30 is a single-pole unit, occupying the full space between a pair of barriers 28; circuit breakers 34 are two-pole units each occupying two such spaces. When E-slot contact terminals 22 are used, it is possible to use two single-pole circuit breakers in the single space between two successive barriers 28, such as have been described by Thomas M. Cole in U.S. patent application Ser. No. 331,871, now Patent 2,921,240 issued January 12, 1960 assigned to the assignee hereof; but inasmuch as such narrow circuit breakers are not made for two-pole applications, the sequence-phase panelboard consideration does not seriously arise.

Figure 3:
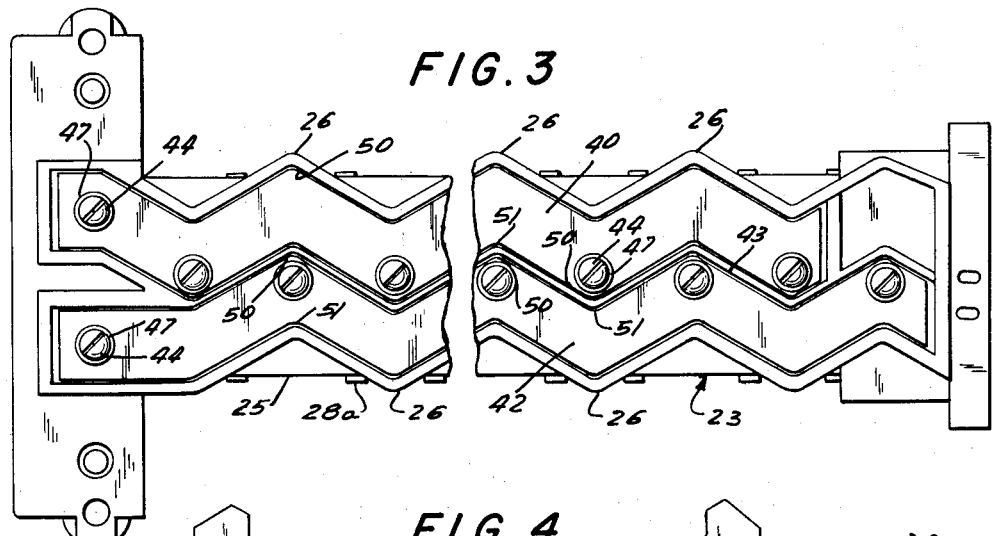
FIGURE 3 is a bottom plan view of the bus assembly of FIGURE 1.
Figure 4:
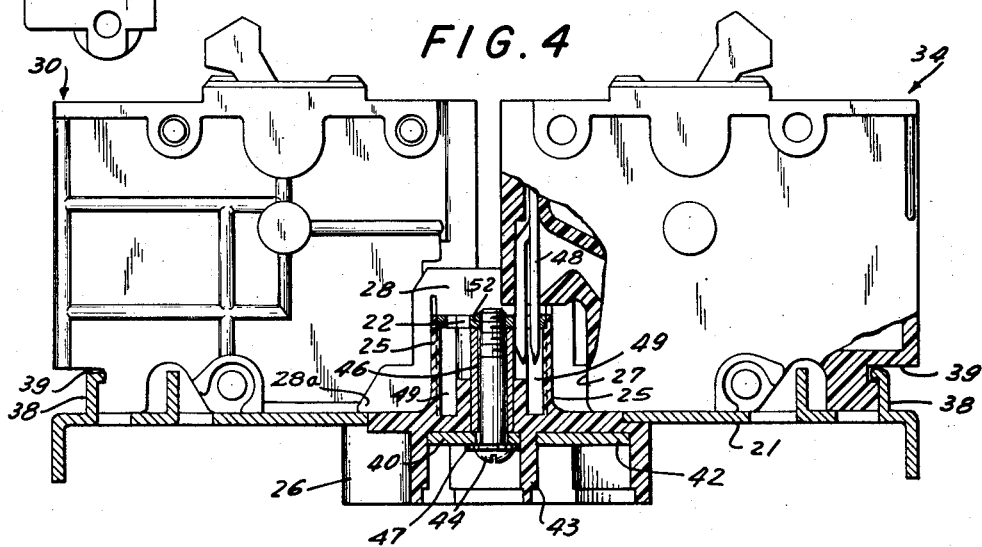
FIGURE 4 is a cross-sectional view of the apparatus in FIGURE 1, along the line 4—4 therein.
Figure 5:
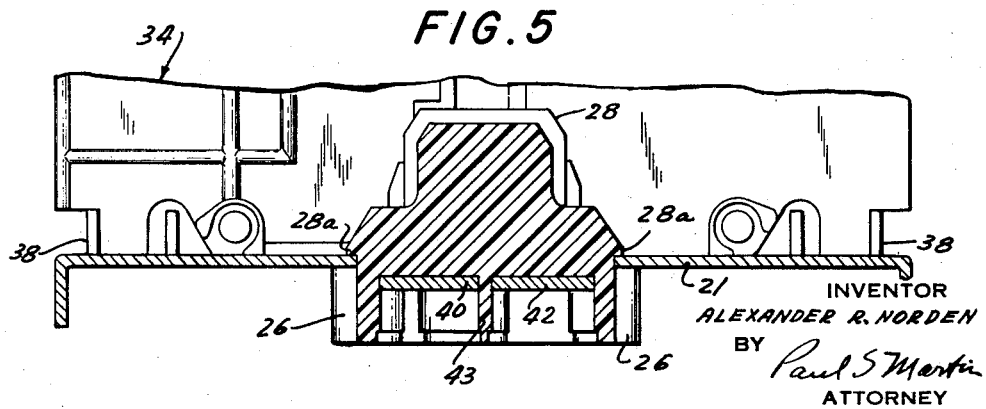
FIGURE 5 is a fragmentary view along the line 5—5 of FIGURE 1.

Line terminals 24 and 24' are connected to bus bars 40 and 42 (FIG. 3) by screws 44 and conductive bushings (like bushings 46, FIG. 4). These bus bars are recessed into the underside of molded member 23, spaced above the bottom of a metal enclosure or box (not shown) insulating walls 26, below pans 21. As seen in FIG. 1, walls 26 project below the projecting edges of the two parts of mounting pan 21, and barriers 28 have projections 28a that overlie the edges of the pan (FIGS. 1 and 5). Molded member 23 has a portion projecting above pan 21 to support contact terminals 22, this projecting portion having side walls 25 that are received in relieved or recessed corners 27 of the circuit breakers (FIG. 4). The circuit breakers are mounted flush against the mounting pan 21, as will be clear from further discussion, particularly of FIG. 4.

FIGURE 3 shows bus bars suitable for a single-phase, three-wire panelboard for relatively heavy currents. Bus 40 and bus 42 are formed with substantially complementary obtuse angles 50 and 51 so that they nest one within the other but are insulated from each other by wall 43 integral with molded insulating member 23. Screws 44 and lock washers 47 mechanically and electrically connect contact terminals 22, copper sleeve 46 and bus bar 40 (or 42) together. Angles 50 and 51 are so chosen that the screws 44 of bus 40 are in line with the screws of bus 42 and all the screws are at the centers of terminal contacts 22 (22a). Successive screws 44 are in alternate bus bars 40 and 42, in each angle 50 of both busses. Since each successive screw 44 is connected to a successive contact terminal 22, it can readily be seen that two-pole circuit breakers 34 may be inserted anywhere along the board at either side of member 23 and the two separate stab contacts 48 of the separate poles of such breakers will each pick up a separate bus. One stab 48 will connect to bus bar 40 and the other will connect to bus bar 42.

FIG. 4 illustrates the details of the connection of circuit breaker 34 to contact terminal 22. The circuit breakers are installed by fitting hook element 38 (shown as part of mounting pan 21) into recess 39 in 34 and pivoting the breaker so as to drive the stab terminal 48 of the circuit breaker into panel terminal 22 or 22a. The details of such breaker installation are covered in U.S. Patent 2,647,225 to Cole et al. which is assigned to the assignee hereof.

It can be seen that the panelboard of FIGS. 1–5 provides a high degree of flexibility, resulting from the sequence-phased construction. Moreover contact terminals 22 (22a) are alike and all connections of the contact terminals to the busses of the different phases are made alike, at the center of the contact terminal. This is made possible by the angles 50 and 51 that give the bus bars a zig-zag appearance. Greater thickness of copper bus bars can be used where heavier currents are involved, without changing the zig-zag form. Two-pole circuit breakers may be installed anywhere along the strip and the respective contacts 48 of the two poles will pick up different busses.

FIGS. 6, 6A, 7 and 8 are similar to FIGS. 1, 2, 3 and 4 and illustrate a specifically desirable application of certain features of my invention, applied to a low power, single-phase, three-wire system. In this embodiment the circuit breakers and the bus assembly are installed flush with the mounting pan, the assembly of the bus bars, insulator and contact terminals all being received in the relieved corner (see corner 27, FIG. 4) of the circuit breakers. This contrasts with the embodiment of FIG. 1 in which much of the bus assembly extends below panel 21 and in which the panel 21 is divided into two parts. In FIGS. 6, 6A, 7 and 8 primed numerals are used for modified parts corresponding to the parts in FIGS. 1–5, the same numerals being used for identical parts.

Panelboard 20' comprises one-piece mounting pan 21'. Insulating strip 23' supports contact terminals 22 and 22a, into which circuit breakers 30 and 34 are plugged as described heretofore in connection with the embodiment of FIG. 1.

Figures 6, 6A, 7:
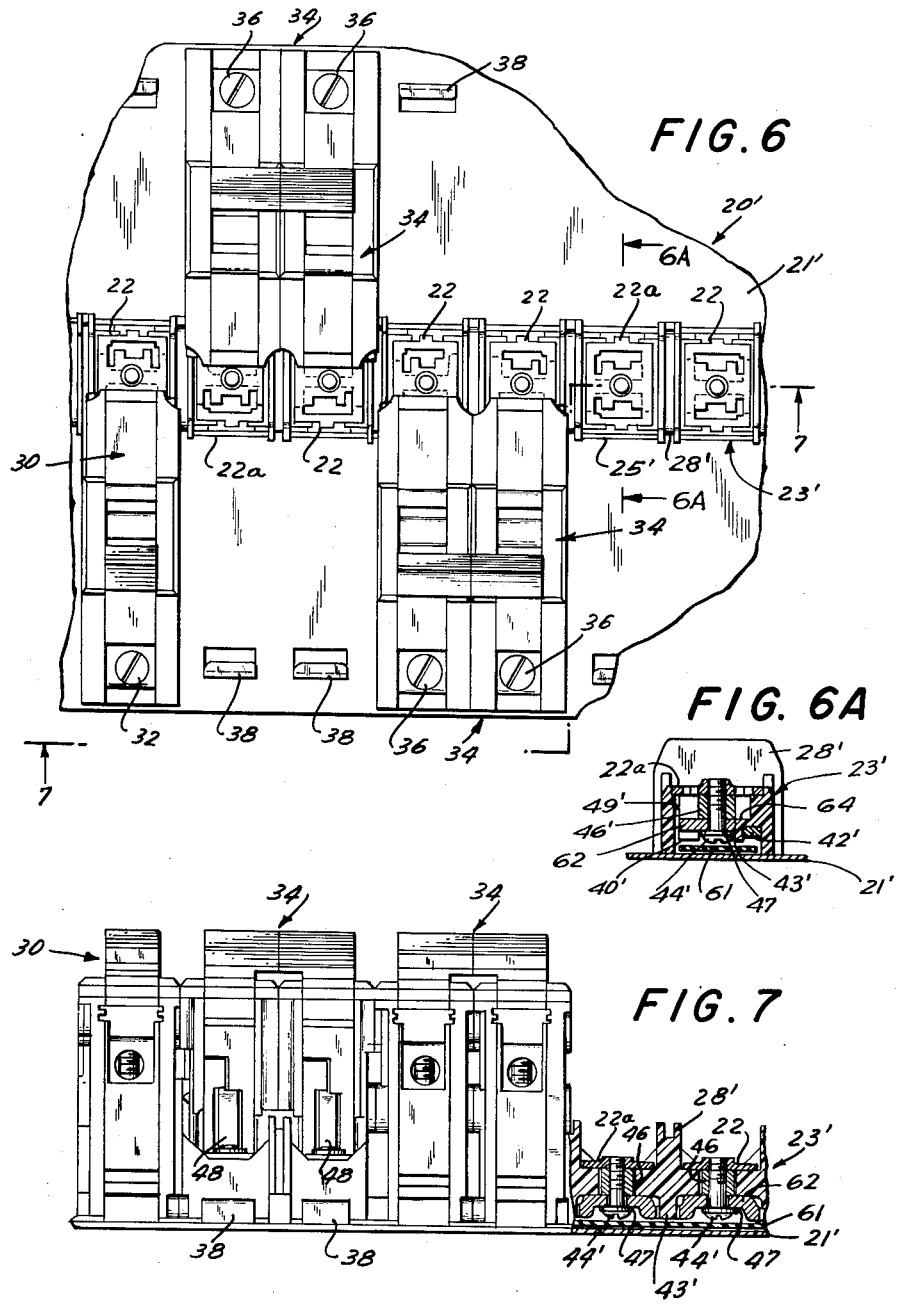
FIGURE 6 is a fragmentary plan view of a second embodiment of my invention.
FIG. 6A is a cross-section along the line 6A—6A in FIG. 6.
FIG. 7 is an elevation of the embodiment in FIG. 6, viewed in the direction of the arrows 7—7 therein.

FIG. 8 illustrates the shape of busses 40' and 42' used in this embodiment. Connection is made alternately from them to alternate aligned contact terminals 22 and 22a by means of screws 44' which extend through holes in the respective obtuse projections 50 of both busses these projections being in a straight line. The outer edges 60 of busses 40' and 42' are straight so that no part of bus bars 40' or 42' protrudes beyond wall 25' of the molded insulator. As described above with respect to the embodiment of FIGS. 1—5, the angles 50 and 51 are formed so that bus bars 40' and 42' nest together while at the same time are spaced and insulated from each other by interposed wall 43' that is an integral part of molded insulator 23'. As in the embodiment of FIGS. 1–5, the sequence-phasing feature is realized without resort to special contact terminals and special connections that are different for the different phases. An insulator 61 that may be either of sheet material or of solidified insulation poured in place, insures adequate insulated separation of the bus bars 40' and 42' from panel 21'. As seen in FIGS. 6A and 8, each bus bar has slight upward offsets 62 to allow clearance between the screw heads and the metal panel 21' while the companion bus bar is flat adjacent that screw. Each offset portion of the bus bars is exposed at the bottom of the cavity 49' in molded insulator strip 23' that receives the circuit breaker stabs 48 (cf. FIG. 4) but the companion bus bar is covered by a wall 64 of insulation integral with insulation strip 23' and channel wall 43'.

In FIGS. 9 and 10 there is illustrated a 100% sequence-phased, three-phase panelboard 120 and bus assembly embodying certain features of my invention also found in FIGS. 1–8, together with certain additional features. The fact that the panelboard is 100% sequence-phased permits the user to insert two-pole and three-pole circuit breakers anywhere along the panelboard's circuit breaker mounting strip 123 with the assurance that the successive circuit breaker poles will be connected to the successive different phases of the three-phase supply. Such circuit breakers have been described in U.S. Patent No. 2,662,949 to P. M. Christensen and in my application Ser. No. 669,808, both of which are assigned to the assignee thereof.

Connection is made from the three-phase power mains to the respective ends of busses 140, 141 and 142 by means of suitable connectors (not shown) like those in FIG. 1 Suitable screws are also used to unite the sections of panel 121 to the molded insulator 123. Contact terminals 22 for the circuit breakers may be of the interchangeable "E" or "F" type previously described and which are mounted on the molded insulator strip 123. Due to the fact that buses 140 and 142 (if not bus bar 141 as well) protrude laterally at 126 beyond the confines of walls 125 of molded insulator 123, the panelboard cannot be installed flush with the back plate 166 of the enclosure and are spaced therefrom in a similar manner to that illustrated in FIGS. 1 through 5. Barriers 128 are all alike and regularly spaced, and may be arranged to project between the poles of successive circuit breakers in the region of the circuit breaker terminals 48. Multipole circuit breakers and the side walls of single pole breakers are sufficiently relieved to accommodate these barriers.

Mounting of single-pole and multi-pole circuit breakers 130 on the panelboard is similar to that described heretofore in that recesses in the circuit breaker cases (see recesses 39, FIG. 4) are engaged with hooks 38 projecting from the panel, and the circuit breaker is pivoted about the hook until the stab contacts carried by the circuit breaker are driven into slots in the associated contact terminals 122 so as to establish pressure contact with the slot edges.

The shape of the nested busses 140, 141 and 142 is substantially as shown in FIGURE 14, there being a portion 144a of gradual slope and a portion 144b providing sharp return slope. The angles are arranged so that all screws 44 which connect the busses to terminals 22 are in a straight line and equally spaced along the line and so that 100% sequence phasing is achieved. Screws 44 are placed at aligned points 150, 151 and 152 in busses 140, 141 and 142 such that the distances between successive screws are equal to each other and to the per-pole spacing of the mounted circuit breakers. The steep return portions 144b of bus bar 141 of one phase pass between connection points 150 and 152 of the other two phases, while the moderately slanted portion 144a of bar 141 affords connection points 151, all without disturbing the regular spacing and the sequence-phasing of the connection points 150, 151 and 152.

It can be seen that the busses illustrated may be cut from a large sheet of copper or like conductive material with very little if any waste, and that in each embodiment the connections to the circuit breaker terminals are aligned and are alike for both the outside legs or phases of a single-phase panelboard or all the phases in a three-phase panelboard. It is within the contemplation of my invention to utilize the novel bussing arrangement described herein in connection with other forms of contacts, such as the well known male or blade contact in place of contacts 22 of the panelboard and the companion female or spring-clip contact in the circuit breakers, in place of the stabs 48 herein illustrated.

The foregoing disclosure of my invention in connection with specific examples and in specific embodiments is intended to be illustrative, since obvious modifications will occur to those skilled in the art without departing from the spirit and scope of my invention.

What is claimed is:

1. A panelboard terminal assembly for circuit breakers or the like comprising a plurality of bus bars insulated from each other and disposed adjacent each other in substantially coplanar relationship, a plurality of aligned individual contact terminals disposed along a center line spaced from said coplanar bus bars, each of said bus bars having lateral projections extending from an edge thereof and having intervening recesses, the projections of each bus bar being nested in the recesses in the adjacent bus bar, each of said bus bars having portions extending in regular sequence across a line parallel to said center line, and aligned connections extending from said bus bar portions to said contact terminals, respectively.

2. A panelboard for circuit breakers comprising an elongated insulator having three channels defined between opposing walls thereof, each such channel containing a bus bar, said bus bars being coplanar, and a regularly spaced and aligned series of contact terminals mounted on the opposite side of said insulator, all of said channels and said bus bars contained therein being zig-zag and complementary in shape and nested with each other and having regularly spaced portions thereof disposed along a straight line in regular phase sequence, one of said walls being interposed between the edges of each adjacent pair of bus bars and aligned identical connections between said contact terminals and said spaced portions of said bus bars, said zig-zag shapes of said bus bars being characterized by a long gentle slope and a sharp return slope.

3. A panelboard for plug-in circuit breakers comprising an elongated insulator having a pair of channels in the bottom thereof, each said channel being defined by opposing walls extending integrally from said insulator, a pair of substantially flat bus bars in said channels respectively, a series of aligned individual contact terminals mounted on the top of said insulator at regular spaced intervals, and aligned electrical and mechanical connections through said insulator from said contact terminals to said bus bars alternately, each of said bus bars being of nearly uniform width and zig-zag in shape and having alternating projecting and recessed edge portions, alternate projecting portions of each of said pair of bus bars being disposed in the recessed portions of the other of said bus bars but insulated therefrom, said connections extending from said bus bars at the projecting edge portions thereof.

4. A three-phase panelboard for circuit breakers comprising three substantially flat coplanar bus bars of zig-zag shape nested with each other and including a center bus bar and two outer bus bars, a series of aligned individual contact terminals, aligned sequence-phased connections between said contact terminals and said bus bars, said zig-zag shape being characterized by long gentle slopes equal in extent, measured along said aligned connections, to two of said contact terminals and sharp return slopes equal in extent, measured along said aligned connections to only one of said contact terminals, said slopes of each bus bar meeting at corners and said connections to said bus bars being located at the middle of the long gentle slopes of the center bus bar and at those corners of the outer bus bars that are directed toward the center bus bar.

5. A panelboard for circuit breakers comprising an insulating support, multiple substantially flat and coplanar bus bars on said support having confronting zig-zag edges providing aligned sequence-phased connection points to the respective flat faces thereof, a zig-zag insulating barrier disposed between said confronting zig-zag edges, a series of aligned individual circuit breaker contact terminals at regularly spaced intervals, and sequential aligned substantially identical electrical and mechanical connections between said contact terminals and said bus bars, at said connection points thereof.

6. A panelboard for circuit breakers comprising an elongated insulator having plural channels defined in the bottom thereof between opposing walls, an equal plurality of substantially flat and coplanar bus bars in said channels, a series of aligned individual contact terminals mounted on the top of said insulator at regularly spaced intervals, and sequential aligned mechanical and electrical connections between said contact terminals and said bus bars, said bus bars being zig-zag in shape and nested with each other but separated edgewise by one of said walls, and a circuit breaker supporting panel extending edgewise against said insulator with portions of the insulator overlying the opposite faces of the panel at longitudinally spaced points, said panel being fixed to said insulator with the plane of the bus bars disposed at one side thereof and with the contact terminals at the opposite side thereof.

7. A panelboard for circuit breakers or the like, including support means and three coplanar bus bars of zig-zag shape assembled thereto, each zig-zag shape including a long gentle slope alternating with a sharp return slope and including regularly spaced portions having aligned terminal connections to said three bars in sequence, said gentle slope being equal in extent along the aligned terminal connections to twice the extent of the sharp return slope along said aligned terminal connections.

8. A panelboard terminal assembly for circuit breakers comprising an elongated member of insulation, a plurality of bus bars mounted on one side of said member in substantially coplanar relationship and a plurality of individual interchangeable circuit breaker contact terminals disposed along a center line on the other side of said elongated member, each of said bus bars having lateral edge projections alternating with complementary edge recesses, the projections of each of said bus bars extending into the recesses of the next adjacent bus bar but being spaced therefrom, a continuous barrier of insulation extending from said elongated member into the space between each bus bar and the next adjacent one, said bus bars having portions extending successively across a line parallel to said center line, and aligned substantially identical electrical and mechanical connections extending through said elongated insulator from said bus bar portions to said contact terminals, respectively.

9. An electrical terminal assembly for circuit breaker panelboards in accordance with claim 8, further including projecting insulating barriers transverse of said elongated member between each said contact terminal and the next adjacent contact terminals.

10. An electrical terminal assembly for circuit breaker panelboards in accordance with claim 8, wherein both edges of each bus bar are of zig-zag shape and related to each other so as to provide a current path of nearly constant width.

11. An electrical terminal assembly for circuit breaker panelboards in accordance with claim 8, wherein said bus bars consist of a pair of bus bars having confronting nested zig-zag edges and opposite straight edges.

12. A sequence-phased panelboard for circuit breakers, including an elongated member of insulation having a companion pair of bus bars mounted on one side thereof in substantially coplanar relationship and a plurality of individual circuit breaker contact terminals centered along a center line on the other side of said elongated member, one edge of each of said bus bars having lateral projections with intervening recesses, said projections extending alternately from said bus bars across a line parallel to said center line so that said projections are nested in the recesses of the companion bus bar, aligned metal connections extending from said projections through said elongated member to said contact terminals for mechanically securing said bus bars and said terminals to said member of insulation and for electrically interconnecting said terminals to alternate ones of said bus bars, a continuous barrier of insulation projecting from said elongated member and interposed between the nested edges of said bus bars, and a generally flat circuit breaker supporting member supporting said elongated member at the bus bar side thereof, said generally flat member having aligned mechanical circuit breaker securing means parallel to but spaced from said elongated member of insulation.

13. A sequence-phased terminal assembly for circuit breaker panelboards comprising an elongated insulator having a plurality of substantially coplanar channels in the bottom thereof defined by integral downwardly projecting walls, electrically separate bus bars in said channels for the respective phases of a power supply line, a series of aligned individual contact terminals mounted on the top of said insulator at regularly spaced intervals, the edges of said bus bars having successive lateral projections and recesses separated from each other by a respective one of said downwardly projecting integral walls but disposed in edgewise nested relationship so that successive bus bars have portions disposed along a line parallel to said individual contact terminals at said regularly spaced intervals along the insulator, the recesses and projections of adjacent bus bars being of complementary zig-zag contour, and a series of identical metal connectors extending through said insulator from said contact terminals to said bus bars in regular succession for providing sequence-phased electrical connection and for uniting said terminals and said bus bars to said insulator.

14. A circuit breaker panelboard, including a terminal assembly having an elongated member of insulation, multiple bus bars assembled thereto and insulated from each other thereby, a series of contact terminals for circuit breakers distributed along a line and having sequence-phased connections to said bus bars, and a pair of sheet-metal members having respective generally flat areas for supporting confronting rows of circuit breakers along and adjacent to said contact terminals and having corresponding mechanical circuit breaker retaining means, each of said sheet-metal members being in edgewise abutment with a respective side of said elongated member of insulation, the latter having locating portions closely overlying and underlying the abutting edges of said sheet-metal members, and securing means mechanically uniting said sheet-metal members to said terminal assembly in the aforesaid relationship.

15. A panelboard terminal assembly, including three coplanar bus bars including a center bus bar and two outer bus bars disposed side by side edgewise, each bus bar having generally zig-zag edges that are nearly uniformly spaced apart so that each bar is of nearly uniform width along its length and shaped to provide relatively long gentle slopes alternating with relatively sharp reverse slopes that meet at successive bends, said bus bars being nested with the convex edges of the bends of one bus bar being received at the concave edges of the bends of the adjacent bus bar, said bus bars having respective portions disposed along a straight line, said portions including those bends of the outer two of the three bus bars that are directed toward the center bus bar and at the middle of each long gentle slope of said center bus bar, and means providing terminal contacts connected to each of said portions.

References Cited in the file of this patent

UNITED STATES PATENTS

| | | |
|---|---|---|
| 2,632,039 | Hammerly | Mar. 17, 1953 |
| 2,647,225 | Cole | July 28, 1953 |
| 2,739,272 | Norden | Mar. 20, 1956 |
| 2,790,113 | Brown | Apr. 23, 1957 |
| 2,794,081 | Luhn | May 28, 1957 |
| 2,823,339 | Locher | Feb. 11, 1958 |
| 2,869,042 | Veitch | Jan. 13, 1959 |
| 2,916,721 | Adams | Dec. 8, 1959 |

FOREIGN PATENTS

| | | |
|---|---|---|
| 930,770 | France | Feb. 4, 1948 |